(12) United States Patent
Parameshwar et al.

(10) Patent No.: US 11,811,858 B1
(45) Date of Patent: *Nov. 7, 2023

(54) SAAS APPLICATION CONTRACT TERMS BENCHMARKING IN A SAAS MANAGEMENT PLATFORM

(71) Applicant: Productiv, Inc., Palo Alto, CA (US)

(72) Inventors: Suresh Parameshwar, Redmond, WA (US); Mengsu Chen, Kirkland, WA (US); Ashish Aggarwal, Los Altos Hills, CA (US); Shantanu Kumar, San Francisco, CA (US); Aditya Jayan, San Ramon, CA (US)

(73) Assignee: Productiv, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/976,675

(22) Filed: Oct. 28, 2022

Related U.S. Application Data (63) Continuation of application No. 17/976,645, filed on Oct. 28, 2022.

(51) Int. Cl.
*H04L 67/10* (2022.01)
*G06Q 50/18* (2012.01)

(52) U.S. Cl.
CPC ............. *H04L 67/10* (2013.01); *G06Q 50/18* (2013.01)

(58) Field of Classification Search
CPC ................................ H04L 67/10; G06Q 50/18
See application file for complete search history.

(56) References Cited

U.S. PATENT DOCUMENTS

| | | | |
|---|---|---|---|
| 2018/0052713 A1* | 2/2018 | Marnell | G06F 9/5027 |
| 2018/0191718 A1* | 7/2018 | Kuzkin | G06F 8/60 |
| 2020/0380530 A1* | 12/2020 | Trim | G06Q 50/18 |
| 2021/0209199 A1* | 7/2021 | Slavin | G06F 40/30 |
| 2021/0326967 A1* | 10/2021 | Geekee | G06V 10/764 |
| 2022/0187847 A1* | 6/2022 | Cella | G05B 19/41885 |

* cited by examiner

*Primary Examiner* — Hua Fan
(74) *Attorney, Agent, or Firm* — Penilla IP, APC (57) ABSTRACT

A method implemented in a software as a service (SaaS) management platform, includes: receiving a plurality of contract files relating to purchases of a SaaS application; identifying terms in the plurality of contract files; assigning a normalization SKU to respective contract files based on the terms identified in the respective contract files; generating anonymized contract data by storing the terms of each contract file in association with the normalization SKU assigned to the contract file in an anonymous manner; responsive to a request from a client device, accessing the anonymized contract data to generate a distribution of terms of the anonymized contract data, generating benchmark data identifying an approximate location of terms of a given customer's contract file within the distribution, and returning the benchmark data to the client device for rendering through a user interface.

20 Claims, 10 Drawing Sheets

| | | | | | |
|---|---|---|---|---|---|
| Video Meetings [Contracts ▼] All instances | | | | △ No Segments available ▼ | □ 30 day engagement as of Jul 30, 2022 ▼ | ▼ |
| Contract Annual Spend $33,282 | | Contract Term Spend $54,087 | | Next End Date JUN 12, 2023 | |

User licenses and line items

| License | Line item description | Contract | End date | Term | Number of licenses | | Annual s/license | Annual $ |
|---|---|---|---|---|---|---|---|---|
| Pro | | | | | | | | $23,788.10 |
| | Standard Biz Annual - Free | Q1019669 | Jun 12, 2023 | 24 months | 143 | x | $166.35 [Below benchmark] | $23,788.10 |
| | Standard Biz Annual | Q1250884 | Jun 12, 2023 | 17 months | | | | $6,020.00 |

This license cost is at the median

-100%  -10% to 10%  +100%

How we calculate this:
Median license cost is calculated using Productiv's aggregated real market data. License cost can be affected by other factors.

| Line Items | | | | | | | | |
|---|---|---|---|---|---|---|---|---|
| | Webinar 500 Annual | Q1019669 | Jun 12, 2023 | 24 months | | | | $5,600.00 |
| | Phone US/Canada Unlimited Calling Named User Annual | Q1019669 | Jun 12, 2023 | 24 months | 2 | x | $168.00 | $360.00 |
| | Phone US/Canada Phone Number Annual | Q1019669 | Jun 12, 2023 | 24 months | 1 | x | $60.00 | $60.00 |
| | | | | | | | User contract annual spend | $29,808.10 |

Non-user line items

| Line item description | Contract | End date | Term | | | $2,994.00 |
|---|---|---|---|---|---|---|
| | Q1019669 | Jun 12, 2023 | 24 months | | | |

1000

US 11,811,858 B1

SAAS APPLICATION CONTRACT TERMS BENCHMARKING IN A SAAS MANAGEMENT PLATFORM

CLAIM OF PRIORITY

This application claims priority as a continuation and the benefit of U.S. patent application Ser. No. 17/976,645 filed on Oct. 28, 2022, entitled "SAAS Application Contract Terms Benchmarking In a SAAS Management Platform", the disclosure of which is incorporated herein by reference in its entirety for all purposes.

1. FIELD OF THE DISCLOSURE

The present disclosure relates to SaaS application contract terms benchmarking in a SaaS management platform.

BACKGROUND

2. Description of the Related Art

Software as a service (SaaS) is a software distribution model in which applications are cloud-hosted and made available to end users over the Internet. This is advantageous for the end users in that a SaaS application is provided "as a service," such that the end users are not required to host or maintain the application, and are enabled to access the application from practically anywhere with sufficient network connectivity. However, the rise of SaaS adoption amongst corporate entities also presents problems from a management perspective. As a given corporate entity may subscribe to many different SaaS applications, efficient SaaS management becomes increasingly difficult as a result.

It is in this context that implementations of the disclosure arise.

SUMMARY

Implementations of the present disclosure include methods and systems relating to SaaS application contract terms benchmarking in a SaaS management platform.

In some implementations, a software as a service (SaaS) management platform (SMP) implemented in a cloud resource having at least one server computer and at least one storage device is provided, the SMP being accessible over the Internet by a plurality of customers that subscribe to the SMP, the SMP including: an uploader process for receiving a plurality of contract files from customers of the SMP via an upload API of the uploader process, the plurality of contract files relate to purchases of a SaaS application; parsing logic programmed to identify terms in the plurality of contract files; normalization logic for assigning a normalization SKU to respective contract files based on the terms identified in said respective contract files, the normalization SKU is further assigned based on features of the SaaS application identified in the respective contract files; a background process that generates anonymized contract data by, for each contract file, storing the terms of the contract file in association with the normalization SKU assigned to the contract file, in an anonymous manner and grouped according to the SaaS application; a backend process that receives a request from a client device associated with a given customer of the SMP, and responsive to said request, accesses the anonymized contract data to generate a distribution of terms of the anonymized contract data, generates benchmark data identifying an approximate location of terms of the given customer's contract file within the distribution, and returns the benchmark data to the client device for rendering through a user interface.

In some implementations, the distribution is generated for the anonymized contract data associated to a given normalization SKU, and wherein the terms from the given customer's contract file are associated to the given normalization SKU.

In some implementations, the normalization SKU is assigned by the SMP independent of the SaaS application.

In some implementations, the benchmark data identifies the approximate location of the terms of the given customer's contract file between two quantiles of the distribution.

In some implementations, the two quantiles are defined by two tertiles of the distribution.

In some implementations, the benchmark data identifies an approximate location of the terms of the given customer's contract file relative to a median of the distribution, wherein the approximate location is defined by identification of a distance range of the terms of the given customer's contract file from the median.

In some implementations, the terms include a cost per license, and wherein the distribution is of cost per license from the anonymized contract data, and wherein the benchmark data identifies an approximate location of cost per license from the given customer's contract file within the distribution.

In some implementations, the terms include a cost per unit of use, and wherein the distribution is of cost per unit of use from the anonymized contract data, and wherein the benchmark data identifies an approximate location of cost per unit of use from the given customer's contract file within the distribution.

In some implementations, generating the distribution includes removing outliers amongst the terms of the anonymized contract data.

In some implementations, generating the distribution is responsive to identifying a minimum number of contract files in the anonymized contract data.

In some implementations, generating the distribution includes identifying a cohort of anonymized customers in the anonymized contract data, the distribution being of terms from the cohort of anonymized customers.

In some implementations, the user interface is presented by the client device on a display.

In some implementations, the parsing logic uses a machine learning model to identify the terms in the plurality of contract files.

In some implementations, assigning the normalization SKU to respective contract files includes applying a fuzzy matching technique to the terms identified in said respective contract files.

In some implementations, a software as a service (SaaS) management platform (SMP) implemented in a cloud resource having at least one server computer and at least one storage device is provided, the SMP being accessible over the Internet by a plurality of customers that subscribe to the SMP, the SMP including: an uploader process for receiving a plurality of contract files from customers of the SMP via an upload API of the uploader process, the plurality of contract files relate to purchases of feature packages of SaaS applications; parsing logic programmed to identify the feature packages and terms of the purchases of the feature packages in the plurality of contract files; normalization logic for assigning a normalization SKU to respective contract files based on the feature package identified in said respective contract files; a background process that generates anonymized contract data by, for each contract file, storing the terms of the contract file in association with the normalization SKU assigned to the contract file, in an anonymous manner, the anonymized contract data being grouped by SaaS application; a backend process that receives a request from a client device associated with a given customer of the SMP, and responsive to said request, accesses the anonymized contract data to generate a distribution of terms of the anonymized contract data for a given normalization SKU, generates benchmark data identifying an approximate location, of terms identified in the given customer's contract file and associated to the given normalization SKU, within the distribution, and returns the benchmark data to the client device for rendering through a user interface.

In some implementations, the distribution is generated for the anonymized contract data associated to a given normalization SKU, and wherein the terms from the given customer's contract file are associated to the given normalization SKU.

In some implementations, the normalization SKU is assigned by the SMP independent of the SaaS application.

In some implementations, the benchmark data identifies the approximate location of the terms of the given customer's contract file between two quantiles of the distribution.

In some implementations, the two quantiles are defined by two tertiles of the distribution.

In some implementations, the benchmark data identifies an approximate location of the terms of the given customer's contract file relative to a median of the distribution, wherein the approximate location is defined by identification of a distance range of the terms of the given customer's contract file from the median.

In some implementations, the terms include a cost per license, and wherein the distribution is of cost per license from the anonymized contract data, and wherein the benchmark data identifies an approximate location of cost per license from the given customer's contract file within the distribution.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may be better understood by reference to the following description taken in conjunction with the accompanying drawings in which:

FIG. 8 illustrates an example of a user interface for accessing customer contract data for a SaaS application, in accordance with implementations of the disclosure.

DETAILED DESCRIPTION

The following implementations of the present disclosure provide methods and systems relating to SaaS application contract terms benchmarking in a SaaS management platform.

It will be obvious, however, to one skilled in the art, that the present disclosure may be practiced without some or all of the specific details presently described. In other instances, well-known process operations have not been described in detail in order not to obscure the present disclosure.

Implementations of the present disclosure are implemented using a SaaS management platform (SMP). Broadly speaking, a SaaS management platform connects to, and obtains data from, a given customer's portfolio of SaaS applications, and provides analysis and insights relating to the customer's usage of their SaaS applications. One example of a SaaS management platform is Productiv™ provided by Productiv, Inc. For a fuller understanding of the present disclosure, an example of a SaaS management platform is herein described.

Figure 1:
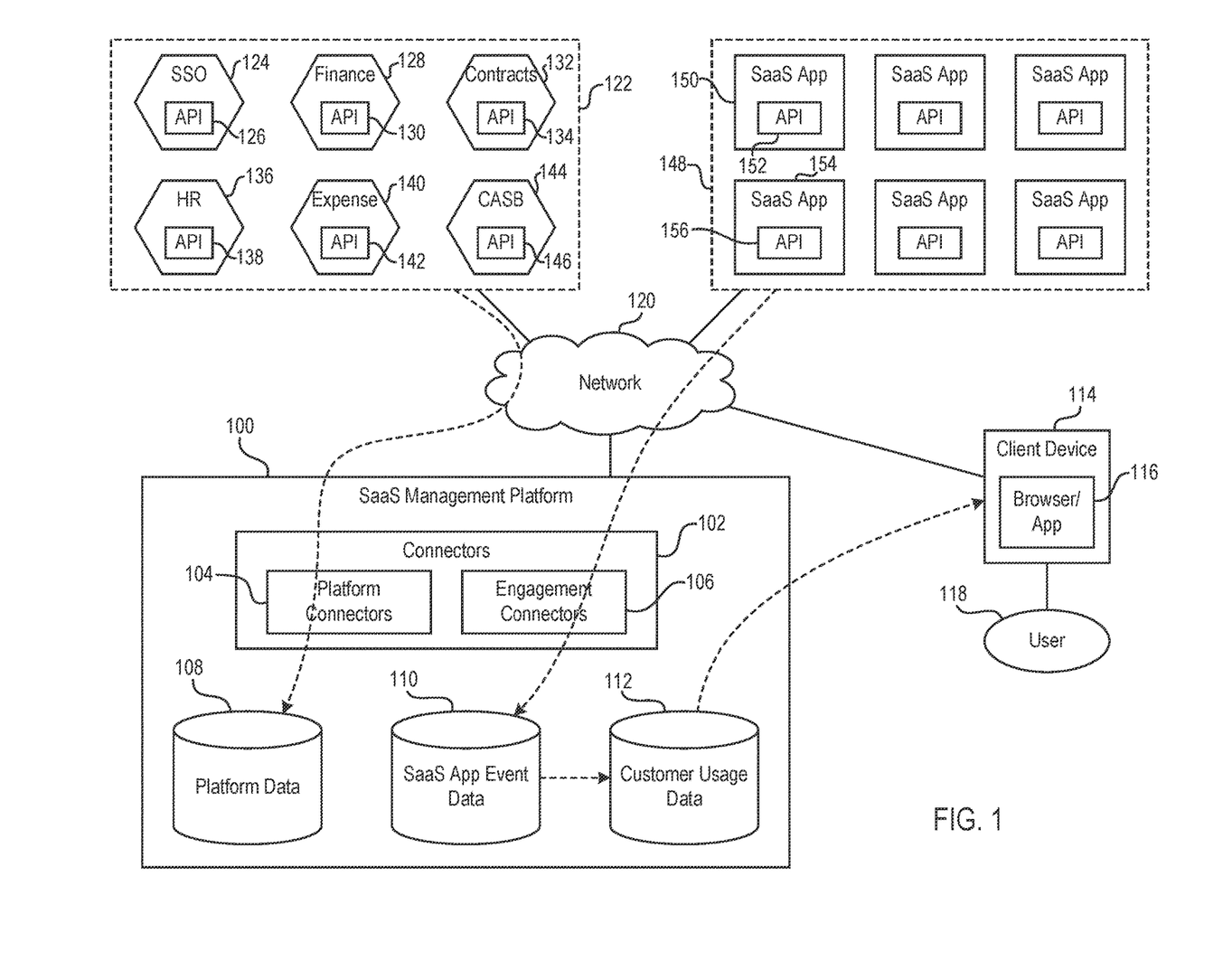
FIG. 1 conceptually illustrates a SaaS management platform and its connection to SaaS applications, in accordance with implementations of the disclosure.

FIG. 1 conceptually illustrates a SaaS management platform and its connection to SaaS applications, in accordance with implementations of the disclosure.

In the illustrated implementation, a SaaS management platform 100 includes connectors 102 that are configured to obtain data from various applications/platforms, typically by calling their exposed Application Programming Interfaces (APIs). Connectors 102 are further distinguished between platform connectors 104 and engagement connectors 106.

Platform connectors 104 are configured to obtain data from platform applications/services 122. Broadly speaking, platform applications 122 provide contextual information to identify, enable access, and understand customer usage context of the SaaS applications which the customer is seeking to manage via the SMP 100. It will be appreciated that platform applications may themselves be SaaS applications, but are distinguished from other SaaS applications in the present disclosure as they are used to provide information about the customer that is used as a contextual basis for understanding SaaS application usage. In some implementations, a given platform application/service may be installed on-premise at the customer organization/entity. Examples of platform applications 122 include a single sign-on (SSO) service 124, a human resources (HR) management system 136, a finance application 128, an expense application 140, a contracts management application 132, and a networking service 144 (e.g. cloud access security broker (CASB)).

In some implementations, the SSO service 124 exposes an API 126, and a corresponding one of the platform connectors for the SSO service 124 is configured to obtain data from the SSO service using the API 126. A list of SSO-enabled applications can be obtained, as well as user login activity for each application, thereby providing broad visibility into the customer's SaaS application portfolio. By way of example without limitation, examples of SSO services include Okta™, Azure Active Directory™, Duo Security™, Idaptive™, OneLogin™ PingOne™, and Google Workspace™.

In some implementations, the HR management system 136 exposes an API 138, and a corresponding one of the platform connectors for the HR management system 136 is configured to obtain data from the HR management system 136 using the API 138. The customer's org chart data can be obtained from the HR management system 136, identifying the reporting structure and various organizational groups within the customer organization. Org chart data can be useful in enabling understanding of SaaS application usage and trends and distinguishing how they vary by team, location, and manager. Examples of HR management systems include Workday™, OneLogin™, Okta™, Azure Active Directory™, and Google Workspace™.

In some implementations, the finance application 128 exposes an API 130, and a corresponding one of the platform connectors for the finance application 128 is configured to obtain data from the finance application using the API 130. Payments data from the finance application 128 can be useful for discovering SaaS applications that are not otherwise known, and may not be managed by the customer's information technology (IT) department. Examples of finance application 128 include ERP systems such as Netsuite™ and Oracle™.

In some implementations, the expense application 140 exposes an API 142, and a corresponding one of the platform connectors for the expense application 140 is configured to obtain data from the expense application using the API 142. As with the payments data noted above, expense data from the expense application can also be useful for discovering SaaS applications that are not otherwise known, and may not be managed by the customer's information technology (IT) department. Examples of expense application 140 include Concur™ and Expensify™

In some implementations, the contracts management application 132 exposes an API 134, and a corresponding one of the platform connectors for the contracts management application 132 is configured to obtain data from the contracts management application using the API 134. Contracts data can be used to provide visibility into license levels and contract spend, enabling recommendations for rightsizing and renewing licenses, as well as reclaiming unused licenses. Examples of contract management applications include Coupa™ and Ironclad™.

In some implementations, the networking service 144 exposes an API 146, and a corresponding one of the platform connectors for the networking service 144 is configured to obtain data from the networking service using the API 146. In some implementations, the networking service 144 is defined by a cloud access security broker (CASB) or other service/application that serves as a security enforcement point between the customer organization/entity and its SaaS applications or other cloud services. Data obtained from the networking service 144 provides another source for discovering applications through user logins and use over network activity.

It will be appreciated that the platform connectors 104 can be configured to automatically update data over time, for example, periodically pulling data from the relevant sources. In this manner, customer-specific contextual data for understanding SaaS application usage is continually maintained and tracks the current state of the customer organization. The data obtained from the customer's platform applications 122 is stored in the SMP 100 as platform data 108. While platform connectors 104 enable automatic retrieval of data directly from the customer's platform applications/services, it will be appreciated that, in the alternative, a given customer may upload their platform application data to the SMP 100.

The engagement connectors 106 are configured to obtain data pertaining to usage of the customer's SaaS application portfolio 148. For example, a given SaaS application 150 may expose an API 152, and a corresponding one of the engagement connectors 106 for the SaaS application 150 is configured to call the API 152 to obtain data describing events that occurred through customer usage of the SaaS application 150. Likewise, a given SaaS application 154 may expose an API 156, and a corresponding one of the engagement connectors 106 for the SaaS application 154 is configured to call the API 156 to obtain data describing events that occurred through customer usage of the SaaS application 154. It will be appreciated that there can be many SaaS applications in the customer's SaaS application portfolio 148, and each may expose an API that is called by a corresponding engagement connector to obtain data describing events occurring through usage of the applications. Such data is stored in the SMP 100 as SaaS app event data 110.

As described in further detail below, the SaaS app event data 110 is processed and analyzed to determine various aggregations and information describing the customer's usage of their SaaS application portfolio 148, which is stored as customer usage data 112. Such usage data can be accessed for viewing via a client device 114 operated by a user 118 (e.g. an employee of the customer organization viewing the usage data of the customer organization). By way of example without limitation, examples of client devices include personal computers, laptops, tablets, cellular phones, mobile devices, etc. In some implementations, the SMP 100 is accessed via a browser or application executed by the client device 114, and the customer usage data 112 is provided for viewing through the browser/application.

Figure 2:
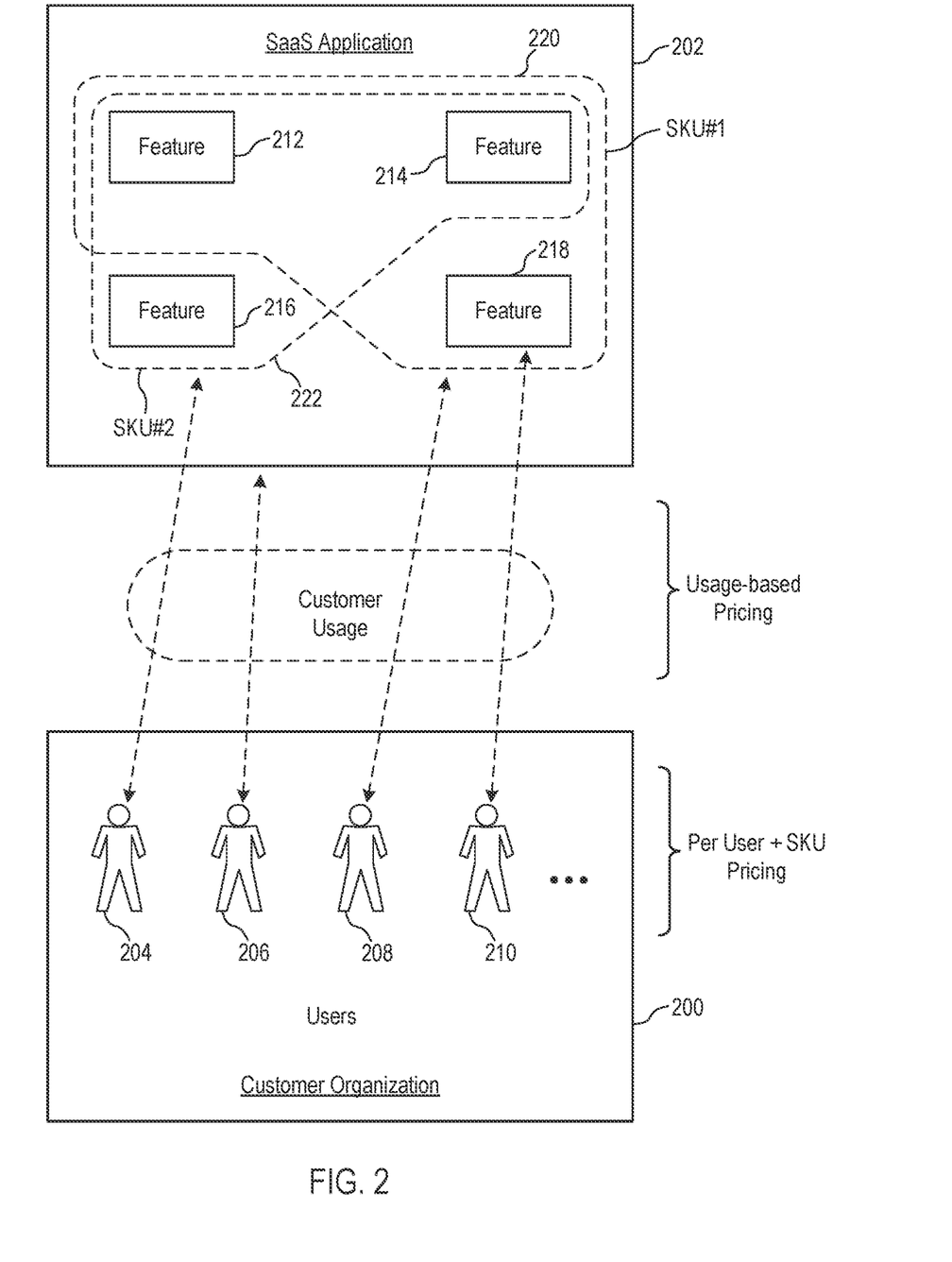
FIG. 2 conceptually illustrates various forms of SaaS application pricing, in accordance with implementations of the disclosure.

FIG. 2 conceptually illustrates various forms of SaaS application pricing, in accordance with implementations of the disclosure.

Providers of SaaS applications can employ various pricing models for their applications that may be based on features, users, and usage. In the illustrated implementation, a customer organization 200 has various users 204, 206, 208, and 210. The users interact with a SaaS application 202 of which the customer organization 200 is a subscriber or purchaser of licenses for the users.

Broadly speaking, a popular SaaS application pricing model is a per user pricing model in which the customer organization 200 pays a fixed amount per user for the SaaS application 202. There may be various tiers, levels, packages, bundles, etc. that define which features of the SaaS application 202 are available for a given user. For purposes of consistency of understanding in the present disclosure, such a grouping of features of a SaaS application that is available for purchase as a unit is referred to as a SKU (stock keeping unit).

For example, in the illustrated implementation, the SaaS application 202 has features 212, 214, 216, and 218. A first SKU 220 is defined to include the set of features 212, 214, and 218, whereas a second SKU 222 is defined to include a different set of features 212, 214, and 216. It will be appreciated that a given SaaS application can have one to many SKUs depending on variability of features and customization of packages for the various customers of the SaaS application. It will be appreciated that a given customer may purchase different SKUs for different ones of its users. For example, in the illustrated implementation, the user 204 may be licensed for SKU 222 whereas the user 208 may be licensed for the SKU 220, and therefore users 204 and 208 have different sets of features available to them when using the SaaS application 202.

In some instances, a SaaS application employing tiers or levels may have SKUs that are additive in terms of features, such that a higher tiered SKU adds features to those of a lower tiered SKU. In other instances, different SKUs may encompass different combinations of features, but are not necessarily additive upon each other.

Some SaaS applications employ a usage-based pricing model, in which customers pay based on their amount of use of the SaaS application and/or specific ones of its features. For example, a storage-related SaaS application may be priced based on the amount of storage used (e.g. priced per terabyte of storage used), or the amount of data uploaded/downloaded, or other metric of usage of storage. As another example, a given SaaS application that services requests from users, including internal and/or external users to the customer, may be priced based on the number of requests serviced. For example, an electronic signature application may be priced based on the number of documents that are sent or otherwise processed for electronic signature. Furthermore, pricing may depend on feature usage, so that different features of the application incur different pricing based on their usage.

It will be appreciated that there is a significant amount of variation in the pricing of SaaS applications. Different SaaS applications may employ different pricing models based on the amount of users and/or usage, and may offer different SKUs which bundle different sets of features. And for a given SaaS application, the pricing for different customers can vary from one to the next, as the pricing for any given customer is often negotiated and embodied in a contract document that is specific for the given customer. In view of these issues concerning pricing of SaaS applications, it will be appreciated that it is challenging for an SMP to provide meaningful insights regarding the pricing of SaaS applications for the customers of the SMP.

With the above in mind, implementations of the present disclosure provide systems and methods for processing contract information to enable a SMP to determine and provide insights for customers regarding SaaS application pricing. Such information can be very useful for helping a customer to understand their existing pricing in relation to those of other customers, as well as, making informed decisions about future purchases or contract renewals of SaaS applications and features.

Figure 3:
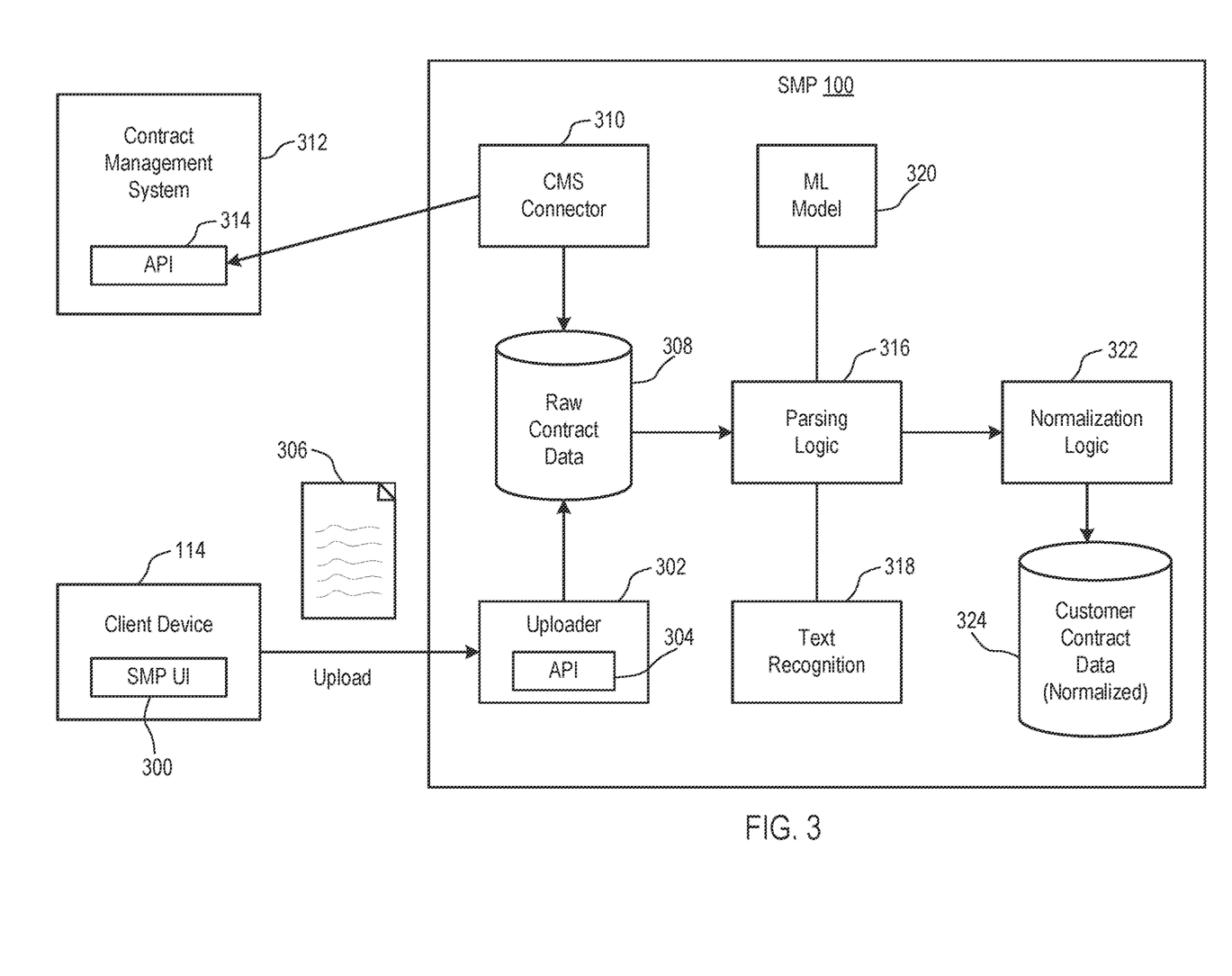
FIG. 3 conceptually illustrates a SMP configured for intake and parsing of contracts from customers of the SMP, in accordance with implementations of the disclosure.

FIG. 3 conceptually illustrates a SMP configured for intake and parsing of contracts from customers of the SMP, in accordance with implementations of the disclosure.

It will be appreciated that information about a purchase of a SaaS application by a customer is typically embodied in a contract or purchase agreement between the customer and the SaaS application provider. In the illustrated implementation, the SMP 100 is configured to receive or obtain contracts from customers which define purchase agreements for SaaS applications by the customers. In some implementations, customers are enabled to upload their contract files (or any other form of contract data or data object(s) in which the customer's contract is embodied) to the SMP 100.

For example, in some implementations, the SMP 100 includes an uploader process 302 that is configured to receive a contract file 306 (over a network including the Internet) from a client device 114 (e.g. which may be operated by a user of a customer of the SMP), and store the contract file 306 to a raw contract data storage 308. The contract file 306 contains text and/or imagery of a contract or purchase agreement for a given SaaS application. It will be appreciated that the contract file 306 can be in any of a variety of file formats, such as various document, image, text, data or word processing formats. Examples of such file formats include PDF, RTF, JPEG, PNG, TIFF, Word/Office (e.g. .doc, .docx), plain text (e.g. ASCII), HTML, XML, XML-based formats, CSV, etc. by way of example without limitation. In some implementations, the uploader process 302 exposes an upload API 304 that is accessed over the network by the client device 114 to enable uploading. In some implementations, the contract file 306 is uploaded through a SMP user interface (UI) 300 that is presented through the client device 114, and which may access the upload API 304. In some implementations, the SMP UI 300 is a web interface presented through browser application 116 executed by the client device 114.

In addition to enabling users to upload contract files/data to the SMP 100, in some implementations, the SMP 100 is configured to obtain contract files (or contract data or data objects which embody the customer contracts) from a contract management system 312 in which the customer has stored their contracts. In some implementations, the SMP 100 includes a contract management system connector 310 that is configured to access an API 314 of the contract management system 312 to obtain the customer's contract information or contract files, which are stored to the raw contract data storage 308.

It will be appreciated that whether uploaded by the customer or provided through a contract management system, the customer's contract files or contract data constitutes raw customer contract data that is stored to the raw contract data storage 308. The SMP 100 includes parsing logic 316 which is configured to analyze the raw customer contract data to identify the terms of customer contracts, including identifying what package of features of a given SaaS application is being purchased and under what pricing conditions in a given contract. In some implementations, the parsing logic 316 applies a text recognition process 318, which can include an optical character recognition (OCR) process to recognize letters and text in imagery if needed.

In some implementations, a machine learning (ML) model 320 is employed by the parsing logic 316 to semantically understand the terms of a given contract. It will be appreciated that the terms of a given contract can identify features of a SaaS application being purchased, SKUs or packages of features being purchased (e.g. tier, level, or other grouping of features), and pricing information such as the pricing model, the cost per unit (e.g. cost per user or license, cost for N users or licenses, cost per unit of usage, etc.), start date, end date, renewal date, billing cycle and/or dates, etc.

Normalization logic 322 is configured to normalize the terms of each contract for storage to a customer contract data storage 324. Normalization generally entails mapping specific identified terms in a contract to standardized terms that are used by the SMP, and addresses the problem of the individualized nature and variation in contract language.

Normalization provides for consistency of contract data across contracts, facilitating aggregation of the contract data and comparison of a given contract against others. In particular, the normalization logic 322 is configured to map feature packages identified in various contracts to normalized SKUs for each given SaaS application, which is discussed in further detail below. By applying normalized SKUs, then it becomes possible to aggregate data and perform benchmarking analysis as described below, across different contracts despite the fact that such contracts may have used different language or descriptors for the same sets of features or SKUs.

In some implementations, the normalization logic 322 employs a fuzzy matching technique to enable matching of descriptive text identifying contract terms, application features, SKUs, or other items in a contract against normalized terms, features and SKUs, etc. Fuzzy matching (also known as fuzzy logic or approximate string matching) enables identification or matching of text portions that are sufficiently similar but not necessarily identical. Examples of fuzzy matching techniques include Levenshtein distance, Hamming distance, Damerau-Levenshtein, etc. In some implementations, descriptions of contract line items (e.g. describing included features or SKUs) are fuzzy matched against a set of normalized features and SKUs, enabling benchmarking of the SKUs and further enabling more granular benchmarking of specific line items or application features.

Figure 4:
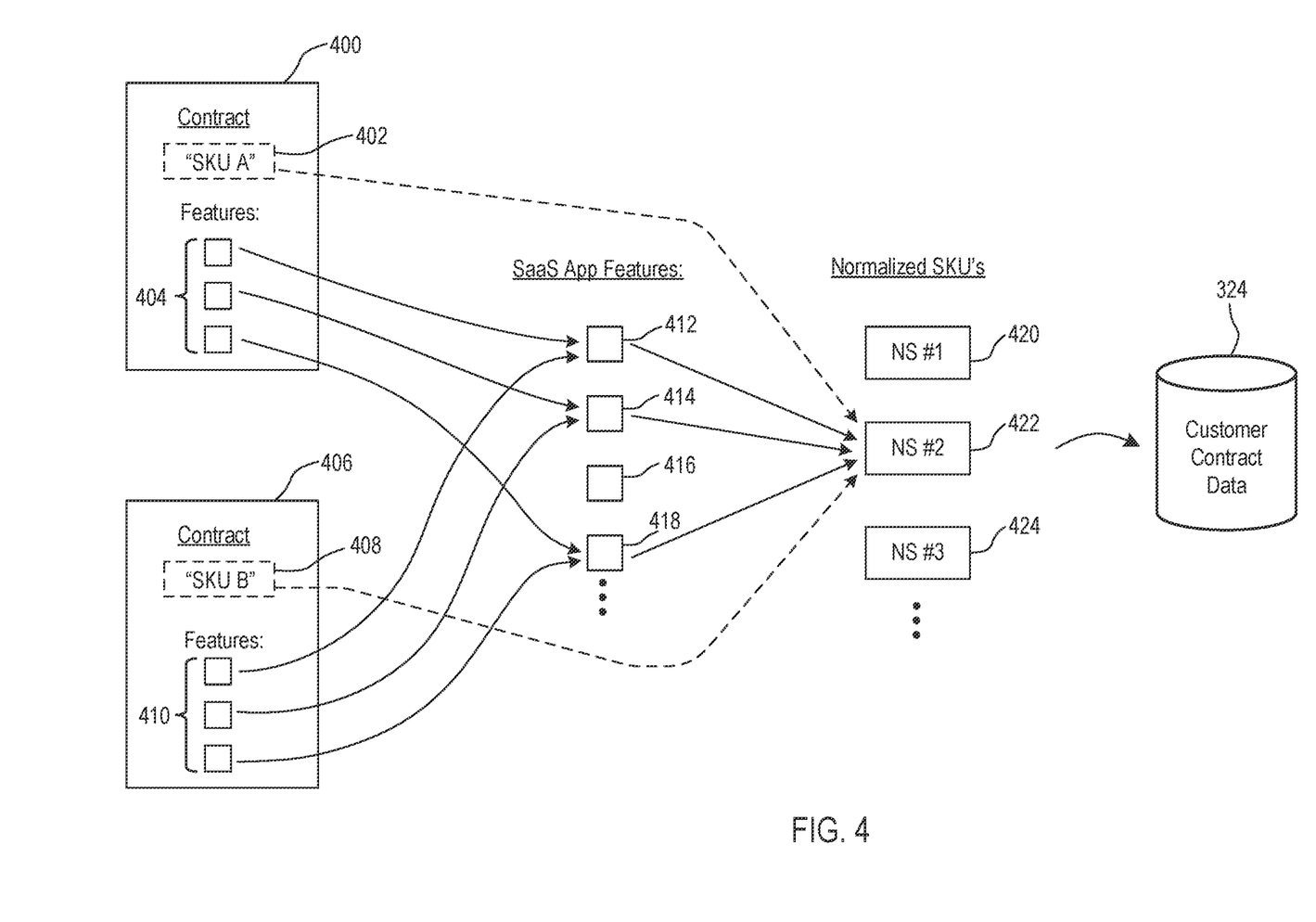
FIG. 4 conceptually illustrates normalization of SKUs identified in contracts for SaaS applications, in accordance with implementations of the disclosure.

FIG. 4 conceptually illustrates normalization of SKUs identified in contracts for SaaS applications, in accordance with implementations of the disclosure.

Automated and systematic use of information obtained from contracts for purchase of a given SaaS application is challenging due to the individualized nature of such contracts. Contracts are tailored to be specific for each customer, often drafted by individuals on a case-by-case basis, and this results in a great amount of variation in the language of the contracts. Thus, different contracts may employ different language while in-fact referring to the same SKU or package of features.

For example, with continued reference to FIG. 4, a contract 400 and a contract 406 are conceptually shown. Both contracts define purchase agreements for a given SaaS application for respective customers. And in fact, both contracts define terms of purchase for the same set of features of the SaaS application. However, the contracts 400 and 406 differ in their language and structure and thus, it is not apparent from mere reading of the contracts 400 and 406 that they represent purchase agreements for the same set of features of the SaaS application.

For example, the contract 400 identifies the purchase of a SKU 402 ("SKU A"), whereas the contract 406 identifies the purchase of a SKU 408 ("SKU B"). Hence, the SKUs identified in the contracts 400 and 406 are different. However, the SKUs actually represent the same set of features of the SaaS application. Therefore, in some implementations, the parsing logic 316 of the SMP 100 is configured to parse the SKUs 402 and 408 from the contracts 400 and 406, and the normalization logic 322 is configured to map the SKUs 402 and 408 to the same normalized SKU 422 ("NS #2"). It will be appreciated that there may be multiple normalized SKUs for a given SaaS application, each normalized SKU representing a given package of features of the SaaS application that may be purchased by a customer. For example, in the illustrated implementation, the normalized SKUs for the SaaS application include normalized SKUs 420, 422, 424, etc., and accordingly, the normalization logic may map a given SKU identified in a contract for the SaaS application to one of these normalized SKUs.

In some implementations, the SKUs 402 and 408 are fuzzy matched to the normalized SKU 422. That is, a fuzzy matching technique is applied to identify the text describing SKUs 402 and 408 as being sufficiently similar to that of the normalized SKU 422.

While a single SKU is identified for purchase in the present examples considering contracts 400 and 406, it will be appreciated that a given contract may contain terms of purchase of multiple SKUs, and accordingly, each of the multiple SKUs can be identified and mapped to corresponding normalized SKUs (e.g. by fuzzy matching in some implementations as presently described).

In some implementations, contract SKUs are normalized through identification of feature sets. For example, in some implementations, the parsing logic 316 is configured to parse specific features of the SaaS application identified in the contracts. For example, a set of features 404 may be parsed from the contract 400 and a set of features 410 may be parsed from the contract 406. The parsed features may be identified as specific ones of the SaaS application's features, and the specific combination of SaaS application features is mapped to a normalized SKU. In the illustrated implementation, the SaaS application may include various features 412, 414, 416, 418, etc. The normalization logic may identify the set of features 404 as having the combination of features 412, 414, and 418, and map this combination to normalized SKU 422. The normalization logic may identify the set of features 410 as also having the combination of features 412, 414, and 418, and therefore also map this combination to normalized SKU 422. In this manner, both the contracts 400 and 406 are mapped to the same normalized SKU based on detection of the features identified in the contracts, and mapping of the combination of features to the corresponding normalized SKU.

In some implementations, the parsed features (constituting descriptive text) are fuzzy matched against a set of normalized features of the SaaS application, enabling identification of parsed features that are not necessarily identically described but sufficiently similar to be identified as referring to the same given SaaS application feature.

It will be appreciated that the customer contract data of a given contract for a given customer is thus stored in association with a normalized SKU, which is determined from the SKU, or combination of features, or other identifying information in the contract that is mapped to the normalized SKU by the system.

Figure 5:
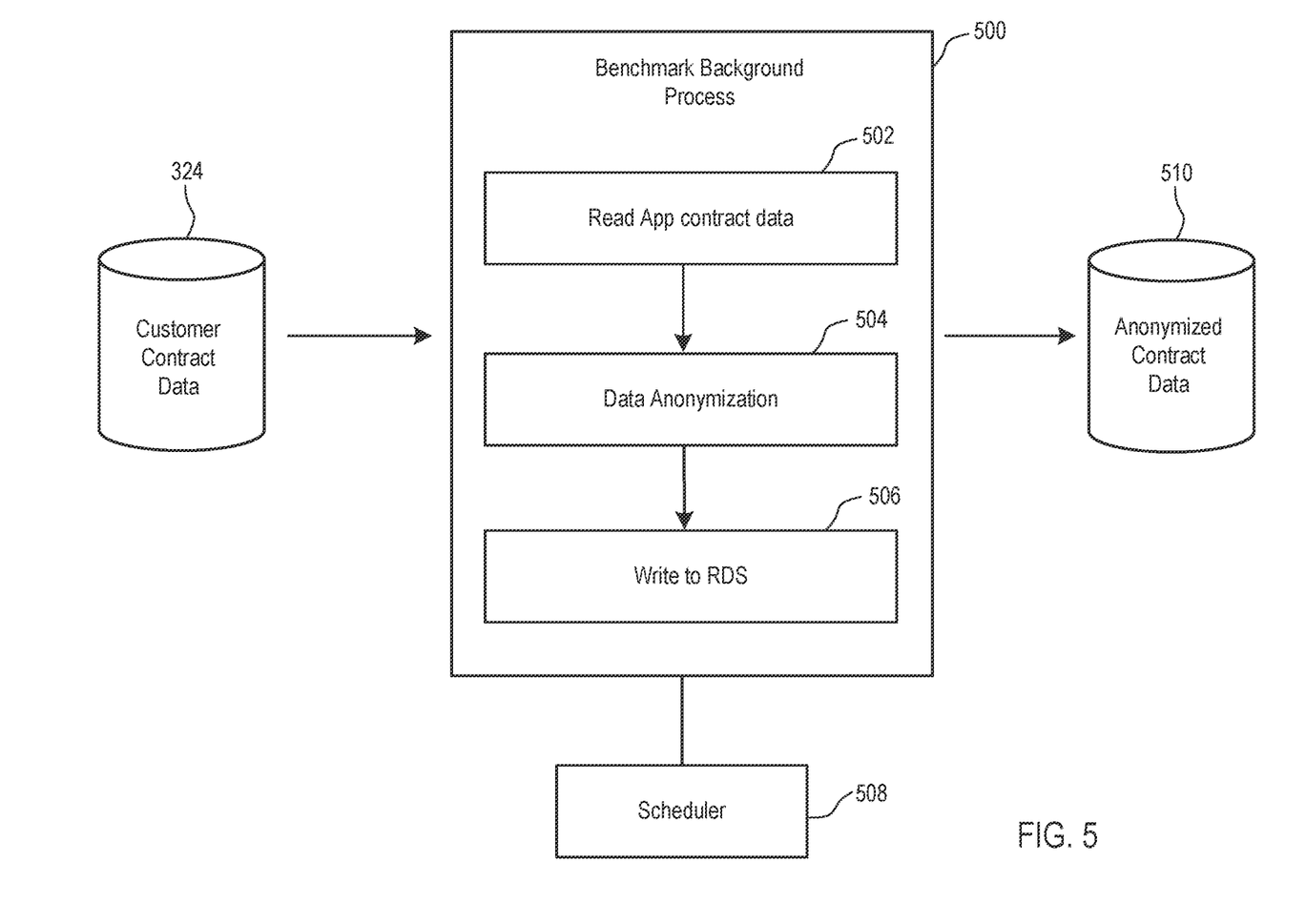
FIG. 5 conceptually illustrates a benchmark background process for anonymizing customer contract data to enable benchmarking of contractual terms, in accordance with implementations of the disclosure.

FIG. 5 conceptually illustrates a benchmark background process for anonymizing customer contract data to enable benchmarking of contractual terms, in accordance with implementations of the disclosure.

As has been described, the customer contract data storage 324 contains customer contract data that has been normalized, including mapping to normalized SKUs, so as to enable data aggregation and comparison amongst various contracts of a given SaaS application. A benchmark background process 500 is implemented by the SMP 100 to process and anonymize the customer contract data, and various process operations undertaken by the process 500 are conceptually shown. At operation 502, the contract data for various applications and SKUs is read from the customer contract data storage 324. At operation 504, the contract data is anonymized. The anonymization includes removing any identifying customer information from the contract data. In some implementations, an anonymous identifier is associated to the contract data of a given customer instead of a customer name or customer identifier that would be recognizable.

At operation 506 the anonymized contract data is stored to an anonymized contract data storage 510, which may include writing to a relational database. It will be appreciated that the anonymized contract data is stored in a separate data storage from the customer contract data, and thus customer anonymity is assured as there is no customer-identifying information in the anonymized contract data. The anonymized contract data is aggregated and organized according to SaaS application and SKU, so that for each SKU of a SaaS application, contract information from customers that purchased the SKU is readily available for processing.

In some implementations, a scheduler 508 is implemented to periodically trigger the benchmark background process 500 to carry out its operations, including anonymizing and aggregating contract data as has been described. In this manner, the anonymized contract data is kept current.

Figure 6:
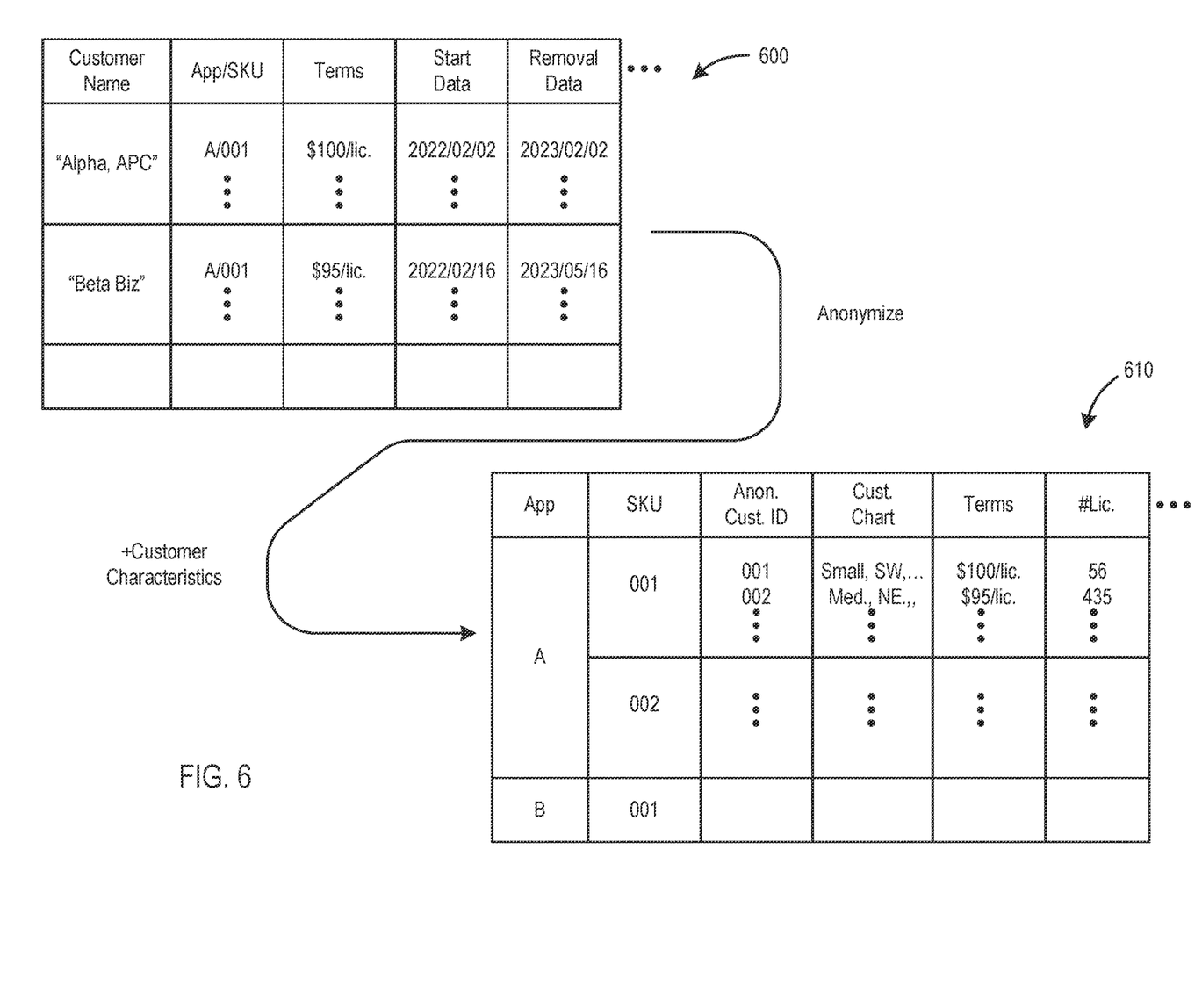
FIG. 6 conceptually illustrates anonymization of customer contract data, in accordance with implementations of the disclosure.

FIG. 6 conceptually illustrates anonymization of customer contract data, in accordance with implementations of the disclosure.

In the illustrated implementation, customer contract data is conceptualized as a table 600 and organized by customer. For example, as indicated in table 600, a customer named "Alpha, APC" has contracts for various SaaS applications and SKUs (normalized), including a contract for an application "A" and SKU "001" as shown. The terms of the contract are at $100 per license, and other contractual information such as the start date, renewal date, etc. are also included in table 600.

Another customer named "Beta Biz" also has a contract for the application "A" and SKU "001" as shown. And the terms of this contract are at per license, and the start date, renewal date, etc. also included in table 600.

In some implementations, to generate anonymized contract data useful for purposes of benchmarking as described below, the customer identifying information is stripped out of the customer contract data. However, characteristics of the customer are kept and associated to the contractual terms, and the anonymized contract data is organized according to SaaS application and SKU. In the illustrated implementation, anonymized contract data generated from the customer contract data described above is conceptually illustrated by table 610.

As shown in table 610, the data are organized by application and SKU. For the application "A" and SKU "001", data from several customer contracts are associated, including the contract data from the customers "Alpha, APC" and "Beta Biz." More specifically, the names of these customers is removed, and each is assigned an anonymous identifier. For example, the customer "Alpha, APC" is assigned the anonymous ID "001" and the customer "Beta Biz" is assigned the anonymous ID "002." Additionally, while the names of the customers are removed, characteristics of the customers are associated to the anonymized contract data. Examples of such characteristics include the size of the customer (e.g. approximate number of employees), industry, location, etc. By way of example without limitation, in the illustrated implementation, the customer "Alpha, APC" (anonymous customer ID "001") has customer characteristics indicating it to be a small business, located in the southwest, etc.; whereas the customer "Beta Biz" (anonymous customer ID "002") has customer characteristics indicating it to be a medium-sized business, located in the northeast, etc.

The terms of each contract are included in the table 610 as shown, and additional information such as the actual number of provisioned licenses or other contractual usage data can be included as well. Thus, the anonymized contract data provides, for each SaaS application and SKU, a listing of contract data including terms for purchase obtained from specific customer contracts, and also associated customer characteristics, but in an anonymous manner that does not identify the actual customers of the SMP.

Figure 7:
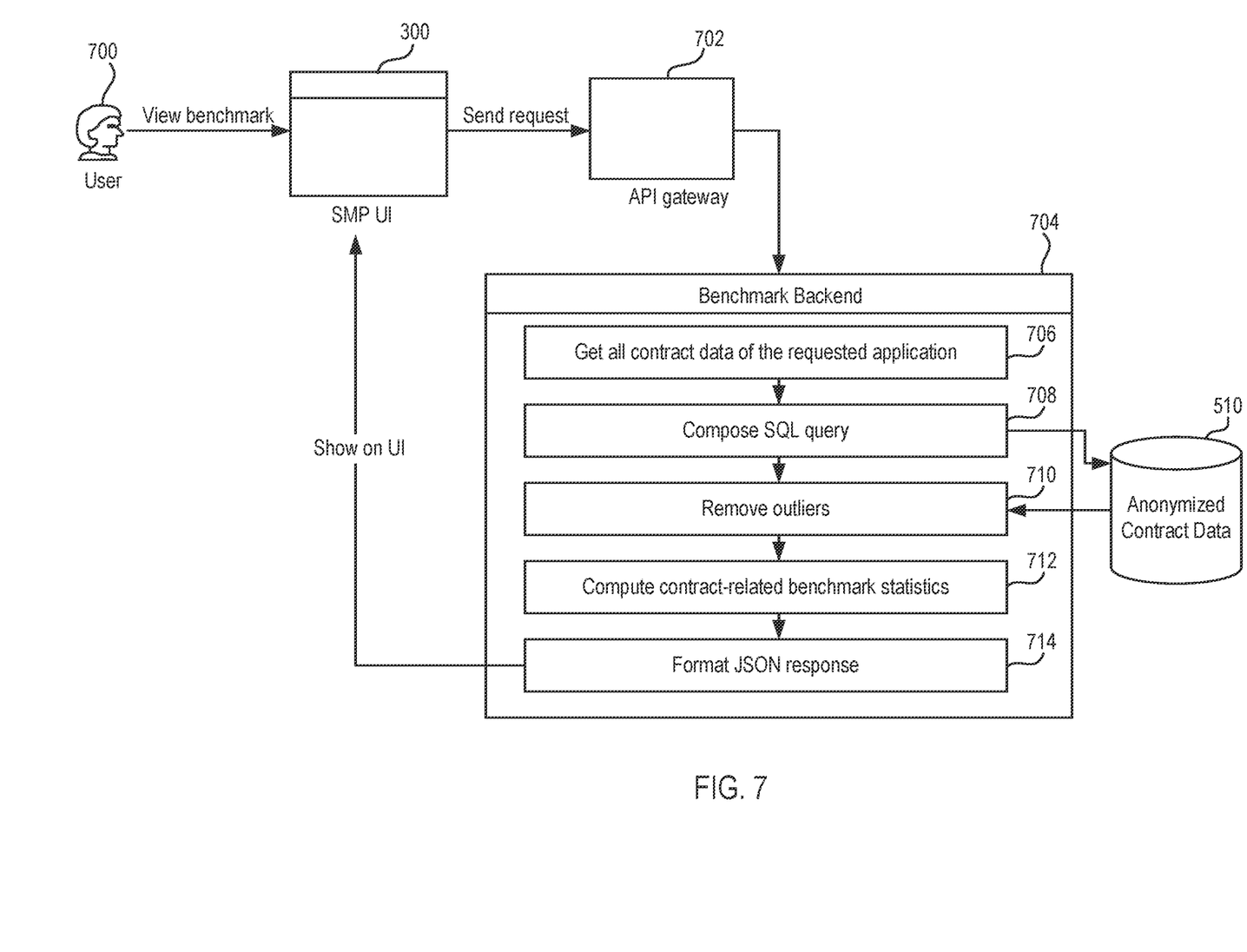
FIG. 7 conceptually illustrates servicing of a request to view a benchmark in a user interface of a SaaS management platform, in accordance with implementations of the disclosure.

FIG. 7 conceptually illustrates servicing of a request to view a benchmark in a user interface of a SaaS management platform, in accordance with implementations of the disclosure.

In the illustrated implementation, a user 700 (e.g. employee or other person associated with a customer of the SMP 100) interacts with the user interface 300 of the SMP 100. The user 700 initiates, through the user interface 300, a request to view one or more benchmarks for a SaaS application. More specifically, the request is to view a benchmark regarding contractual terms of a particular SKU (normalized) of a SaaS application. The request is sent to an API gateway 702 of the SMP 100, triggering a benchmark backend logic 704 to perform a process to service the request.

At process step 706, the incoming request is received to obtain all the anonymized contract data of the requested SKU of the SaaS application.

At process step 708 a query (e.g. database query such as a SQL query) is composed to retrieve the relevant data from the anonymized contract data storage 510. That is, the query is configured to retrieve the anonymized contract data that pertains to the specified SKU of the SaaS application. In some implementations, this includes contract data of each anonymized customer organization that had contract data stored for the requested SKU of the SaaS application.

In some implementations, the query is configured to retrieve contract data from a cohort of customers having characteristics similar to that of the requesting user's customer organization. That is, the query is configured to retrieve contract data of the requested SaaS application and SKU, from the anonymized contract data 510, such that the contract data is from anonymized customers having specified characteristics which define the cohort (e.g. size, industry, number of licenses, number of SaaS applications in portfolio, geographic location, etc.).

At process step 710, outliers are removed or discarded from the retrieved contract data. In some implementations, this can entail removing contract data that is from customers having fewer than a predefined number of licenses (e.g. less than 50, less than 10, etc.). In some implementations, removing outliers is performed by removing contract data indicating terms for a customer organization that are extremely low or extremely high relative to those of the other customer organizations (e.g. greater than two standard deviations from a mean/average of terms, greater than a predefined amount outside of an interquartile range, falling in a top or bottom range of distribution (e.g. top or bottom percentile ranges). For example, if the price/license for a given customer is extremely low or extremely high, then this term will not influence the benchmark determination, as it will be excluded from the data set as an outlier.

In some implementations, a machine learning (ML) model is trained to recognize outliers in the contract data, based on various factors, including characteristics of the anonymized customer organization, and characteristics of the contract data. Such a trained ML model can be used to identify outliers, which are discarded from the retrieved contract data.

At process step 712, following removal of outliers from the retrieved usage data, then contract-related benchmark statistics are computed for the SaaS application and SKU of interest. Broadly speaking, these benchmarks identify typical contractual terms of customers of the SMP 100 that have purchased the SaaS application and SKU, and information regarding how the requesting customer's contractual terms compare. As noted, the customers included can be a cohort of customers of which the requesting user's customer organization is a member (e.g. customers with similar characteristics to the requesting user's customer organization).

It will be appreciated that various types of contract-related benchmarks are possible for a given SaaS application and SKU. For example, in some implementations, a benchmark for the SaaS application and SKU can identify, for a cohort of anonymized customer organizations, an average or median of contractual terms such as the price per unit (e.g. price per license/user, price per unit of use, etc.). In some implementations, a benchmark identifies one or more portions of a distribution of the contractual terms, such as a top/upper/middle/lower/bottom range of the distribution, a range between quantiles of the distribution (e.g. an interquartile range; ranges between zeroth and first, first and second, or second and third tertiles, etc.), a percentile range, etc. It will be appreciated that such information can be useful for a customer of the SMP that is considering purchase of a given SaaS application and SKU, as for example, it may inform the customer about approximate pricing to be expected or to target in negotiations.

In some implementations, a benchmark identifies, at least approximately, where the terms of a requesting customer (that is already a purchaser of the SaaS application and SKU) fall within the distribution of contractual terms of the cohort. In some implementations, a benchmark identifies which portion of the distribution the terms of the requesting customer fall within, such as any of the above-identified portions of the distribution. In some implementations, a benchmark identifies, at least approximately, how far a customer's terms are located from the median of the distribution, such as indicating that the customer's terms fall within x percentile of the median for the customer's cohort. It will be appreciated that by providing information about ranges of the distribution, and/or providing information about where a requesting customer's terms are located within the distribution, then it is possible to provide the customer with information that does not specifically identify exact numbers of contractual terms, but which is nonetheless useful in enabling the customer to assess whether their contractual terms are similar to those of other customers. This can be useful, for example, in determining how to approach a contract renewal, such as by informing approximate pricing to target for renewal.

In the above-described benchmarking of contractual terms, benchmarking of SKUs has been specifically described as an example of such benchmarking. However, in other implementations, benchmarking of specific features of the SaaS application or other contract line items can be performed in a similar manner. For example, in some implementations, a benchmark of price or cost (e.g. per user) for a given feature of the SaaS application is provided.

At process step 714, a response to the original request including the relevant benchmarks is prepared and returned for rendering in the user interface 300 to be viewed by the user 700. In some implementations, this entails formatting the response in a suitable file/data format, such as JSON, XML, CSV, etc.

In some implementations, the benchmark backend logic 704 is further configured to perform additional types of analysis and processing of the anonymized contract data, which can be surfaced through the user interface 300 in response to requests as has been described. For example, in some implementations, the benchmark backend logic 704 is configured to analyze the anonymized contract data of a given SaaS application and SKU to determine, at least approximately, the boundary of a volume discount for the SKU. For example, the approximate number of licenses/users or the approximate amount of use necessary to reach a volume discount can be determined by analyzing the anonymized contract data.

In some implementations, the benchmark backend logic 704 is configured to train a machine learning (ML) model using the anonymized contract data to predict contractual terms for a given customer, SaaS application and SKU. For example, the ML model can be trained to predict, based on characteristics of the customer and certain specified terms such as the number of licenses or amount of use sought, an expected price or other terms for purchase of the SaaS application and SKU.

In some implementations, benchmarks for a given SKU of a SaaS application are not provided unless there are a sufficient number of contracts or purchase orders for the SKU. That is, in some implementations, a minimum number of contracts for purchase of the SKU are required before a benchmark is determined or provided by the system. It will be appreciated that in some implementations, the minimum required is a minimum number of customers in the requesting customer's cohort that have contracts for the SKU. In some implementations, the minimum required is a minimum number remaining following removal of the outliers as discussed above.

FIG. 8 illustrates an example of a user interface for accessing customer contract data for a SaaS application, in accordance with implementations of the disclosure.

The illustrated user interface is configured to access an SMP as has been described, enabling a customer of the SMP to view their SaaS application related information as stored and presented by the SMP. In the illustrated view, from the menu shown on the left side, the "APPS" button is highlighted, indicating current viewing of an apps section of the user interface as shown. More specifically, a "Contracts" tab 800 is currently selected for viewing contract data related to a SaaS application "Video Meetings."

In a "Contract details" section 802, data about a given contract is provided, such as the contract dates, term, etc. In the illustrated implementation, various contracts are organized in tabs including a tab 804 for a specific contract with a PO Number/Order ID "87721." A more specific listing of user license tiers and line items as included in the tab 804 for the contract "87721."

Also included in the interface is a "Documents" section 806. From this section, the original uploaded contract file 808 is displayed and accessible (e.g. opened or downloaded) by clicking on the name of the file as shown. Additionally, a button 810 is selectable to initiate an interface for uploading a new contract into the SMP.

Figure 9:
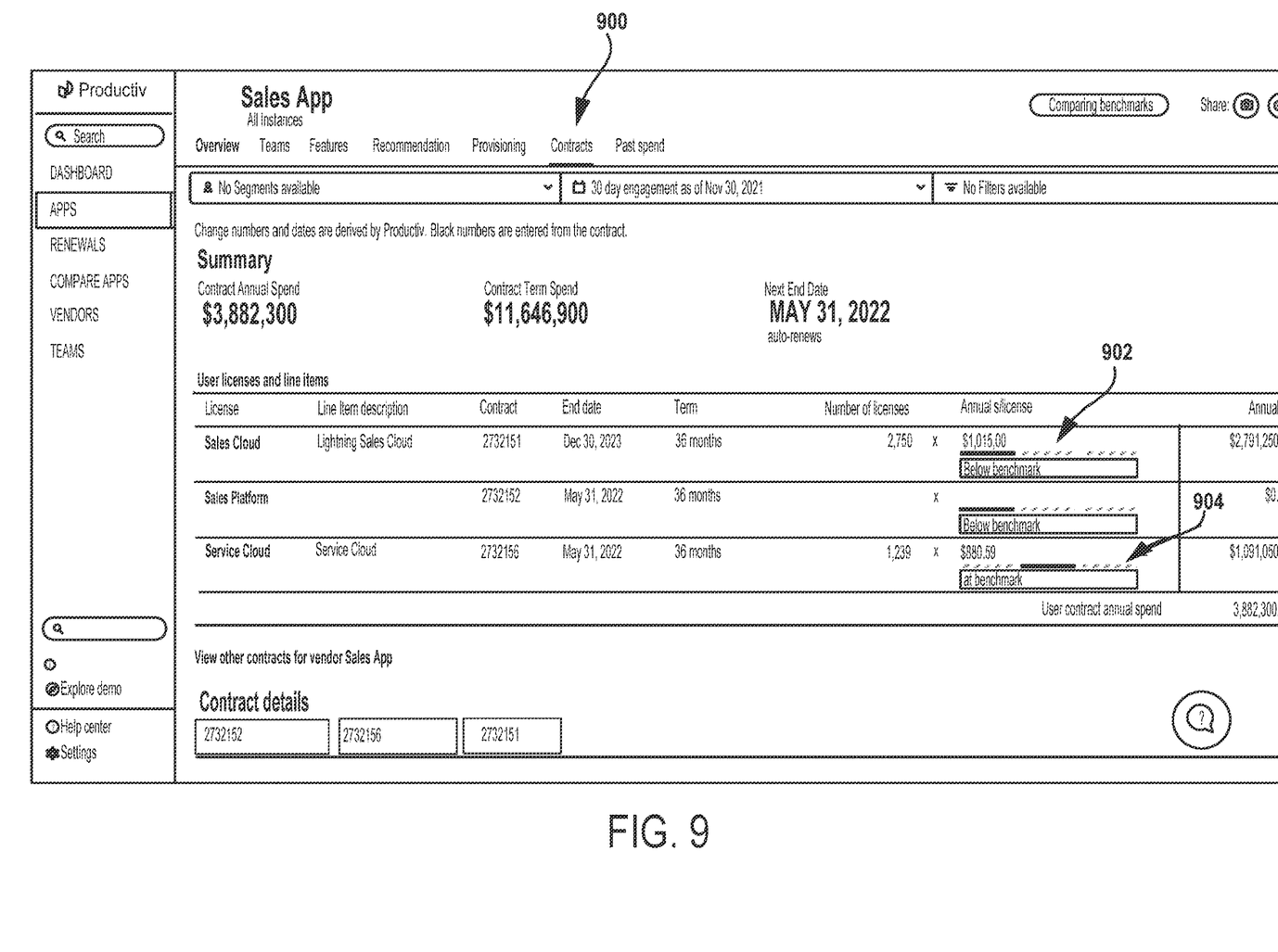
FIG. 9 illustrates an example of a user interface displaying contract-related benchmark information, in accordance with implementations of the disclosure.

FIG. 9 illustrates an example of a user interface displaying contract-related benchmark information, in accordance with implementations of the disclosure.

As shown in the illustrated implementation, a "Contracts" tab 900 is selected for viewing contract information for a SaaS application "Sales App."

At reference 902, a display of contract-related benchmark information is graphically shown. Specifically, the illustrated series of bars and accompanying text indicates that the annual cost per license for the contract 2732151 is below the benchmark. In particular, the series of bars is configured to indicate that the annual cost per license is in the bottom third of the distribution of license costs across a cohort of customers including the current customer. In other words, the current customer is revealed to be paying a lower price than most other customers.

As another example, at reference 904, the illustrated bars and accompanying text indicate that the annual cost per license for contract "2732156" is at benchmark, or within the middle third of the distribution of license costs across the cohort.

Figure 10:
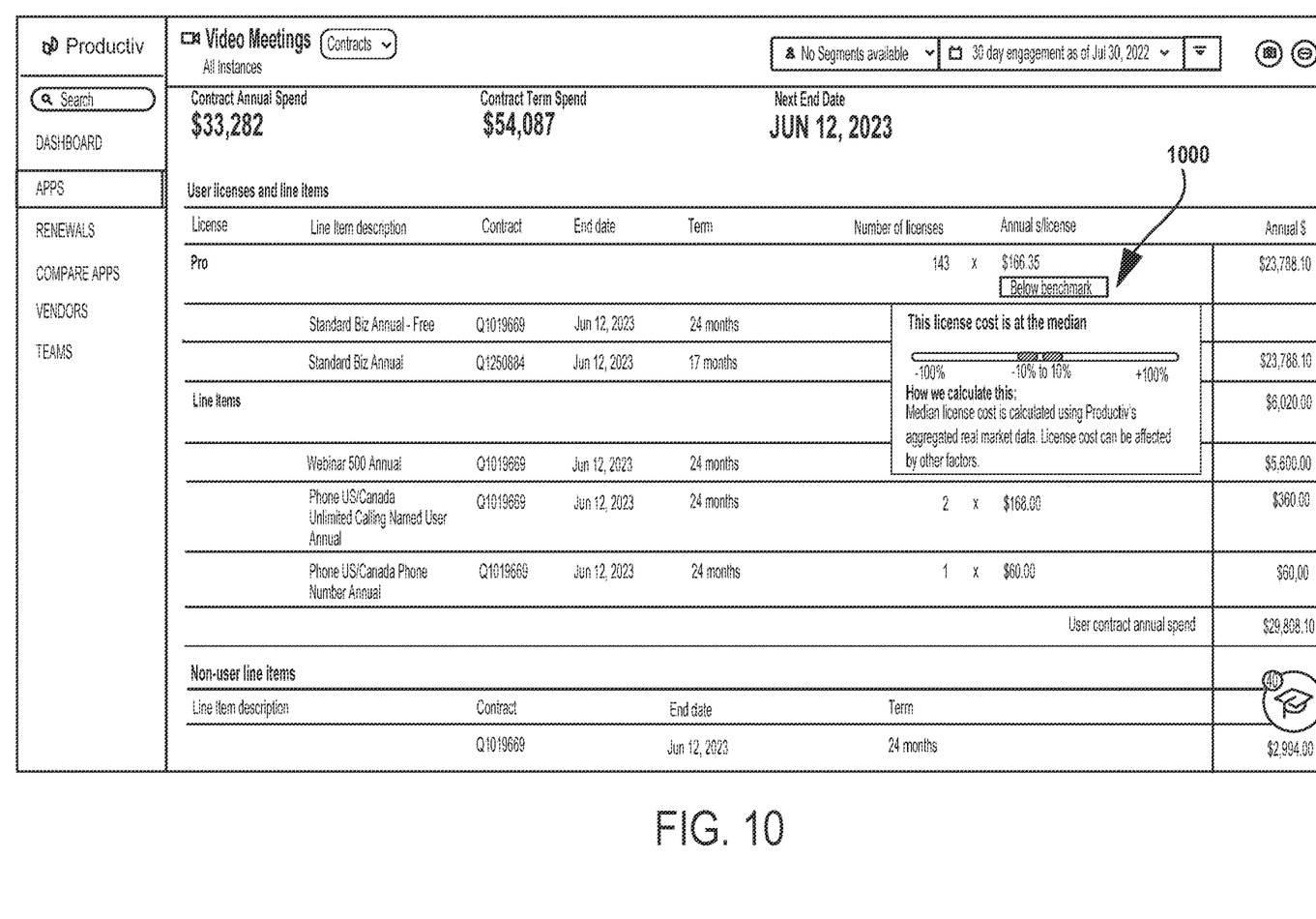
FIG. 10 illustrates an example of a user interface displaying contract-related benchmark information, in accordance with implementations of the disclosure.

FIG. 10 illustrates an example of a user interface displaying contract-related benchmark information, in accordance with implementations of the disclosure.

As shown in the illustrated implementation, at reference 1000, a display of a pricing benchmark is shown, indicating that the annual cost per license is at the benchmark. More specifically, the benchmark display shows that the license cost of the current requesting customer is within 10% of the median of customers in a cohort including the current customer.

In one configuration, the SMP includes compute and storage resources for management of SaaS applications. As described above, a web user interface (UI) can be provided to enable remote client devices to use and access services of the SMP. In some implementations, at least some code integrated with the UI is configured to make API calls to the SMP to access data, compute and storage resources. In one embodiment, the compute and storage resources which run the SMP are run in a cloud-based environment. The cloud-based environment, for example, may be provided by a cloud compute and storage servicing entity, e.g., such as Amazon Web Services (AWS)™, Google™ Cloud, Microsoft™ Azure™, or other serving entities. In some configurations, hybrid cloud systems may be used, wherein some processes are executed by a cloud compute and storage servicing entity and other processes are serviced by private servers and storage or a private cloud. In still other embodiments, the processing can be executed entirely on private services and storage or private cloud configuration. In some embodiments, the servicing entities are referred to as hosting services, which provide the hardware and internet connectivity to execute applications, processes, and workflows using various types of hardware configurations.

In some configurations, data that is retrieved from the various SaaS entities using APIs or other accessing code can be stored in one or more databases that make access and further processing more efficient. By way of example, a relational database may be executed for storing data, retrieval of data, and manipulation (e.g., processing) of data. In one embodiment, the database may use a structured query language (SQL) as the programming language that is used to manage relational database data and perform various operations on the data in them. Without limitation, sometimes databases may be referred to as relational database management systems (RDBMS), relational data stream management systems (RDSMS), or simply a database. Generally, relational databases are particularly useful in handling structured data, i.e., data incorporating relations among entities and variables, such as data obtained and processed by an SMP. It should be understood that other database standards or protocols can be used, so long as the processing of SaaS data can be performed for rendering benchmarking and analytics and/or presentation tasks.

In some configurations, the hardware configurations may include virtualized hardware and expandable storage to meet the processing needs of the SMP. Broadly speaking, the SMP is executed using cloud infrastructure, which includes the use of one or more multiple interconnected data centers throughout the world. Based on the load demands for servicing the SMP, the resources may be expanded.

It should be apparent that the present embodiments may be practiced without some or all of these specific details. Modification to the modules, code and communication interfaces are also possible, so long as the defined functionality for the SMP or modules of the SMP is maintained. In other instances, well-known process operations have not been described in detail in order not to unnecessarily obscure the present embodiments.

One or more embodiments can also be fabricated as computer-readable code on a non-transitory computer-readable storage medium. The non-transitory computer-readable storage medium is any non-transitory data storage device that can store data, which can thereafter be read by a computer system. Examples of the non-transitory computer-readable storage medium include solid state drives (SSDs), hard drives, network attached storage (NAS), read-only memory, random-access memory, persistent memory, CD-ROMs, CD-Rs, CD-RWs, magnetic tapes and other optical and non-optical data storage devices. The non-transitory computer-readable storage medium can include computer-readable storage medium distributed over a network-coupled computer system so that the computer-readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

While the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the described embodiments and sample appended claims.

What is claimed is:

1. A method implemented in a software as a service (SaaS) management platform (SMP) implemented in a cloud resource having at least one server computer and at least one storage device, the SMP being accessible over the Internet by a plurality of customers that subscribe to the SMP, the method comprising:
   receiving a plurality of contract files from customers of the SMP via an upload API of the SMP, the plurality of contract files relate to purchases of a SaaS application;
   identifying terms in the plurality of contract files by a parsing logic of the SMP;
   assigning a normalization SKU to respective contract files based on the terms identified in said respective contract files, the normalization SKU is further assigned based on features of the SaaS application identified in the respective contract files;

generating anonymized contract data by, for each contract file, storing the terms of the contract file in association with the normalization SKU assigned to the contract file, in an anonymous manner and grouped according to the SaaS application;

receiving a request from a client device associated with a given customer of the SMP, and responsive to said request, accessing the anonymized contract data to generate a distribution of terms of the anonymized contract data, generating benchmark data identifying an approximate location of terms of the given customer's contract file within the distribution, and returning the benchmark data to the client device for rendering through a user interface.

2. The method of claim 1, wherein the distribution is generated for the anonymized contract data associated to a given normalization SKU, and wherein the terms from the given customer's contract file are associated to the given normalization SKU.

3. The method of claim 1, wherein the normalization SKU is assigned by the SMP independent of the SaaS application.

4. The method of claim 1, wherein the benchmark data identifies the approximate location of the terms of the given customer's contract file between two quantiles of the distribution.

5. The method of claim 4, wherein the two quantiles are defined by two tertiles of the distribution.

6. The method of claim 1, wherein the benchmark data identifies an approximate location of the terms of the given customer's contract file relative to a median of the distribution, wherein the approximate location is defined by identification of a distance range of the terms of the given customer's contract file from the median.

7. The method of claim 1, wherein the terms include a cost per license, and wherein the distribution is of cost per license from the anonymized contract data, and wherein the benchmark data identifies an approximate location of cost per license from the given customer's contract file within the distribution.

8. The method of claim 1, wherein the terms include a cost per unit of use, and wherein the distribution is of cost per unit of use from the anonymized contract data, and wherein the benchmark data identifies an approximate location of cost per unit of use from the given customer's contract file within the distribution.

9. The method of claim 1, wherein generating the distribution includes removing outliers amongst the terms of the anonymized contract data.

10. The method of claim 1, wherein generating the distribution is responsive to identifying a minimum number of contract files in the anonymized contract data.

11. The method of claim 1, wherein generating the distribution includes identifying a cohort of anonymized customers in the anonymized contract data, the distribution being of terms from the cohort of anonymized customers.

12. The method of claim 1, wherein the parsing logic uses a machine learning model to identify the terms in the plurality of contract files.

13. The method of claim 1, wherein assigning the normalization SKU to respective contract files includes applying a fuzzy matching technique to the terms identified in said respective contract files.

14. A method implemented in a software as a service (SaaS) management platform (SMP) implemented in a cloud resource having at least one server computer and at least one storage device, the SMP being accessible over the Internet by a plurality of customers that subscribe to the SMP, the method comprising:

receiving a plurality of contract files from customers of the SMP via an upload API of the SMP, the plurality of contract files relate to purchases of feature packages of SaaS applications;

identifying the feature packages and terms of the purchases of the feature packages in the plurality of contract files by a parsing logic of the SMP;

assigning a normalization SKU to respective contract files based on the feature package identified in said respective contract files;

generating anonymized contract data by, for each contract file, storing the terms of the contract file in association with the normalization SKU assigned to the contract file, in an anonymous manner, the anonymized contract data being grouped by SaaS application;

receiving a request from a client device associated with a given customer of the SMP, and responsive to said request, accessing the anonymized contract data to generate a distribution of terms of the anonymized contract data for a given normalization SKU, generating benchmark data identifying an approximate location, of terms identified in the given customer's contract file and associated to the given normalization SKU, within the distribution, and returning the benchmark data to the client device for rendering through a user interface.

15. The method of claim 14, wherein the distribution is generated for the anonymized contract data associated to a given normalization SKU, and wherein the terms from the given customer's contract file are associated to the given normalization SKU.

16. The method of claim 14, wherein the normalization SKU is assigned by the SMP independent of the SaaS application.

17. The method of claim 14, wherein the benchmark data identifies the approximate location of the terms of the given customer's contract file between two quantiles of the distribution.

18. The method of claim 17, wherein the two quantiles are defined by two tertiles of the distribution.

19. The method of claim 14, wherein the benchmark data identifies an approximate location of the terms of the given customer's contract file relative to a median of the distribution, wherein the approximate location is defined by identification of a distance range of the terms of the given customer's contract file from the median.

20. The method of claim 1, wherein the terms include a cost per license, and wherein the distribution is of cost per license from the anonymized contract data, and wherein the benchmark data identifies an approximate location of cost per license from the given customer's contract file within the distribution.

* * * * *